United States Patent [19]
Atack

[11] Patent Number: 4,764,072
[45] Date of Patent: Aug. 16, 1988

[54] FASTENNG DEVICE

[76] Inventor: Frank Atack, P.O. Box 1013, Tauranga, New Zealand

[21] Appl. No.: 836,145

[22] Filed: Mar. 4, 1986

[30] Foreign Application Priority Data

Mar. 4, 1985 [NZ] New Zealand ................... 211302

[51] Int. Cl.⁴ ........................................... F16B 15/06
[52] U.S. Cl. ................................... 411/456; 411/452; 411/463; 52/714
[58] Field of Search ............... 411/461, 462, 463, 464, 411/465, 466, 467, 468, 470, 475, 477, 478, 456, 921, 340, 452; 52/213, 363, 714

[56] References Cited

U.S. PATENT DOCUMENTS

| | | | |
|---|---|---|---|
| 651,016 | 6/1900 | Marugg | 411/478 |
| 1,066,646 | 7/1913 | Nauman | 411/475 X |
| 1,599,985 | 9/1926 | Carlson | 411/461 X |
| 1,697,456 | 1/1929 | Carlson | 411/461 |
| 2,065,525 | 12/1936 | Hamilton | 52/363 X |
| 2,377,169 | 5/1945 | Mohr | 411/465 |
| 2,439,220 | 4/1948 | Rothfuchs | 52/714 X |
| 2,534,739 | 12/1950 | Silberman | 411/478 X |
| 2,966,705 | 1/1961 | Massey | 52/714 X |
| 3,389,525 | 6/1968 | Moody | 52/714 |
| 3,459,396 | 8/1969 | Buttriss | 411/340 |
| 4,439,970 | 4/1984 | Rosner | 411/466 X |

FOREIGN PATENT DOCUMENTS

| | | | |
|---|---|---|---|
| 324811 | 9/1920 | Fed. Rep. of Germany | 52/714 |
| 808279 | 7/1951 | Fed. Rep. of Germany | 411/477 |
| 1117289 | 11/1961 | Fed. Rep. of Germany | 52/213 |
| 7903465 | 10/1979 | Netherlands | 52/714 |
| 175643 | 6/1961 | Sweden | 52/714 |

Primary Examiner—Neill Wilson
Attorney, Agent, or Firm—Wegner & Bretschneider

[57] ABSTRACT

A fastening device comprises an elongated sheet metal plate having at least one lengthwise stiffening rib, a pointed end, the tip of which is preferably inclined to the general plane of the device, and, preferably, a depth stop so that when the pointed end is driven into a wooden member up to the depth stop the other end of the device may be bent and may be secured to another object by fastening means provided in the other end.

11 Claims, 5 Drawing Sheets

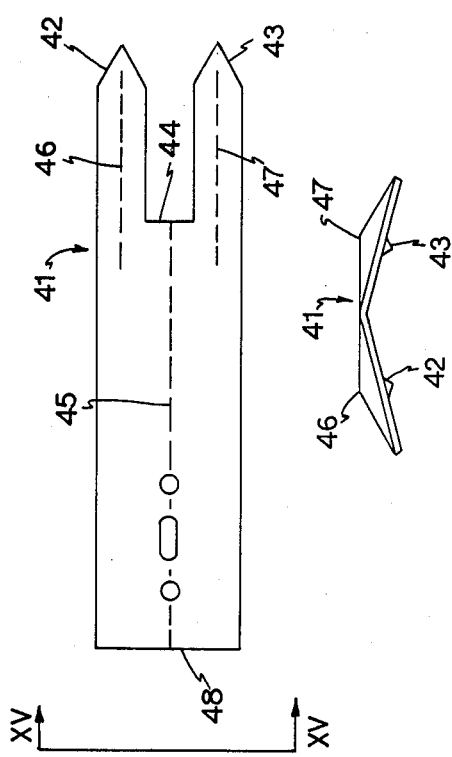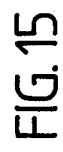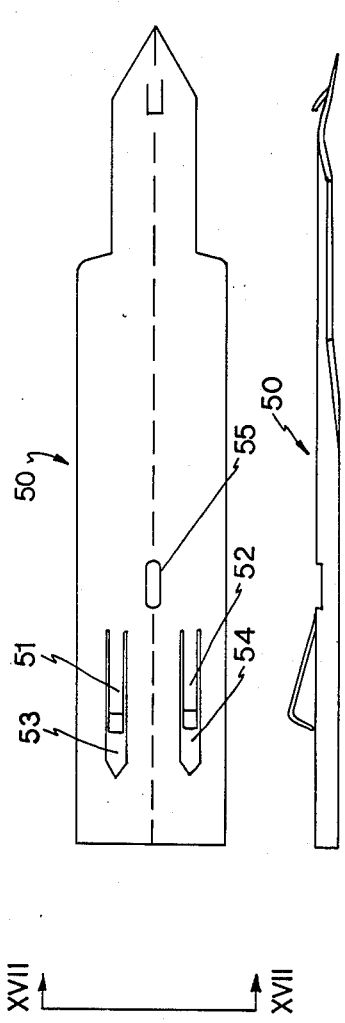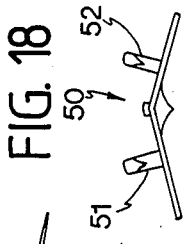

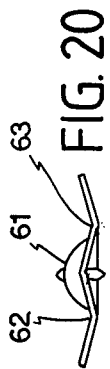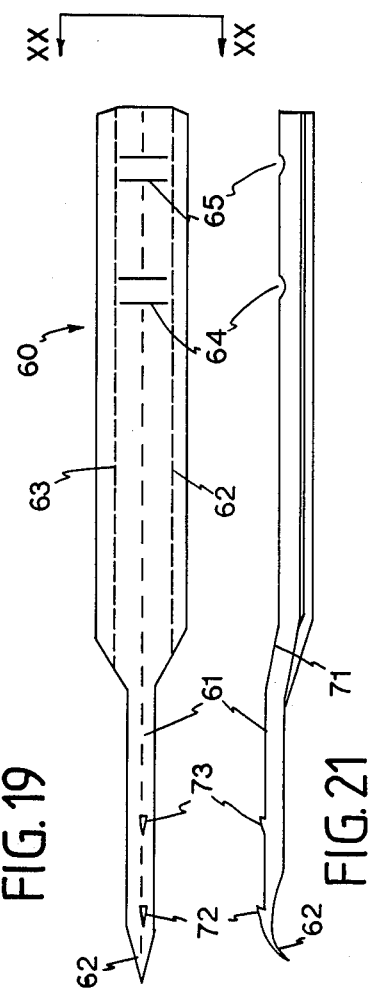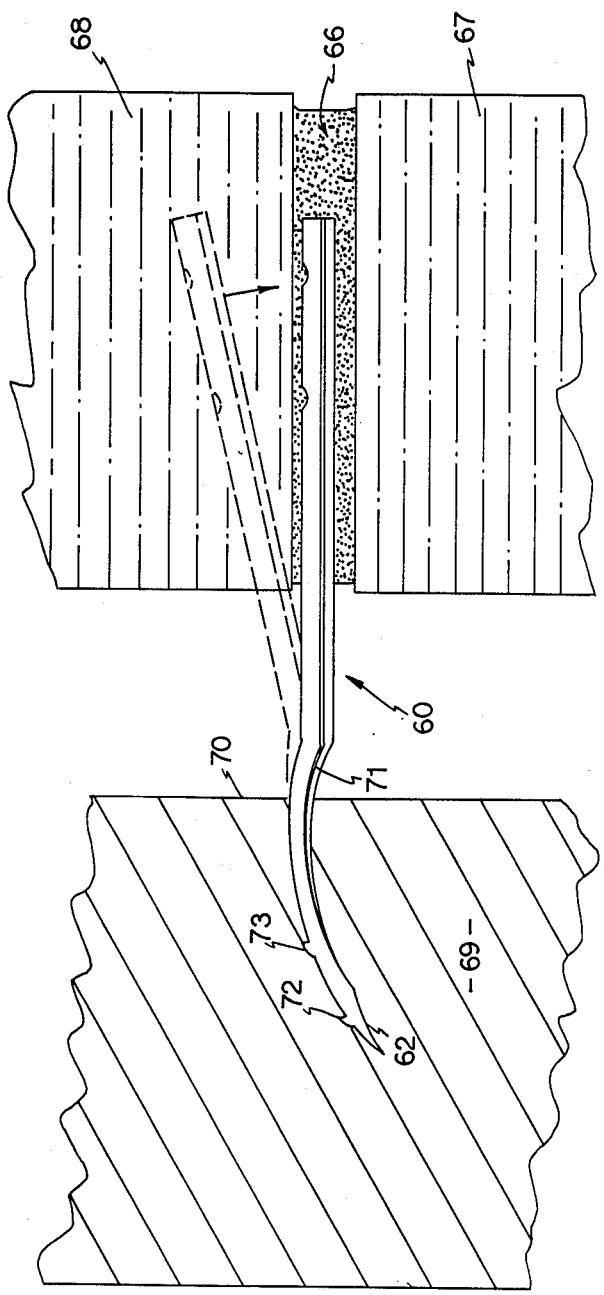

FASTENNG DEVICE

BACKGROUND OF THE INVENTION

This invention relates to a fastening device which facilitates the fixing of wooden door jambs or window frames to parts of a timber framework such as studs or lintels or, in an alternative form facilitates the anchoring of brickwork or masonry to a timer framework.

It has been practice in the past to fit door jambs or window frames into a framework using fox wedges, which are pairs of wedges having the same slope, which are placed on top of one another, the amount of overlap of the wedges being adjusted to pack the gap between the jamb or window frame and the framework. When the jamb or window frame is properly aligned, the fox wedges are secured in position by nailing through the face of the jamb or window frame. This method is not only time consuming, but it creates nail holes which have to be filled and smoothed prior to the jamb or window frame being painted or varnished. The face of the jamb or window frame is inevitably marred by such procedures.

New Zealand patent specification No. 165212 discloses a plate which is adapted to be nailed across the back of a door jamb or window frame, the plate having an arm at each end provided with fixing holes, so that whe the jam has been placed in the position the arms can be bent at right angles to the main body of the plate so that they flank either side of the framework and can be attached to it by means of nails.

Such plates however, are cumbersome and costly because of their bulk and because they are held to the jamb or window frame by only two nails they are not very securely fixed. There is also known a wall tie for brickwork or masonry which is substantially "L" shaped, one arm having holes therein to facilitate its nailing to the framework while the other arm has protuberances adapted to key into mortar. Such devices rely entirely on the holding power of, usually two, nails and are also cumbersome and slow to fasten.

BRIEF SUMMARY OF THE INVENTION

The invention consists in a fastening device comprising an elongated sheet metal plate having a lengthwise stiffening rib, one end of the plate being pointed and fastening means being provided in the plate adjacent the other end.

BRIEF DESCRIPTION OF THE DRAWINGS

Preferred forms of the present invention will be described with reference to the accompanying drawings in which:

FIG. 14 shows a plan view from above of an alternative form of fastening device having two pointed ends, FIG. 15 shows an end elevation in the direction XV—XV, FIG. 16 shows a plan view from above of another embodiment of the invention, FIG. 17 shows an end elevation of that embodiment in the direction XVII—XVII, while FIG. 18 shows a side elevation, FIG. 19 shows a plan view of yet another embodiment designed for use in securing masonry or brickwork to a wooden framework, FIG. 20 shows an end elevation of that embodiment in the direction XX—XX, FIG. 21 shows a side elevation, and FIG. 22 shows a cross-section through a stud and brick wall with one of the fastening devices of FIGS. 19 to 21 shown unsectioned.

DETAILED DESCRIPTION OF THE PREFERRED EMBODIMENT

Figure 2:
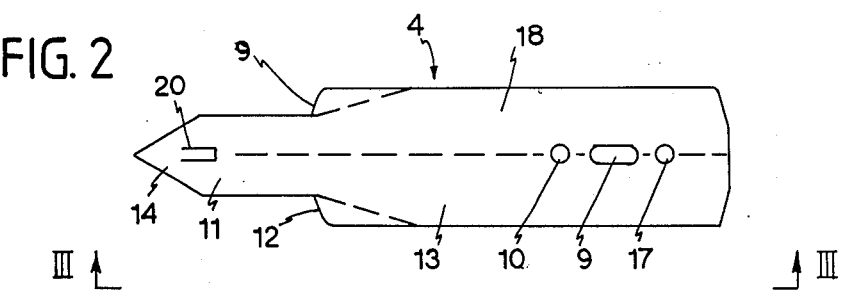
FIG. 2 shows a plan view from above of the preferred form of fastening device.
Figure 3:
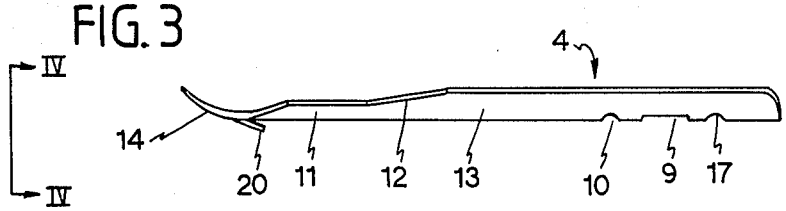
FIG. 3 shows a side elevation in the direction III—III.
Figure 4:
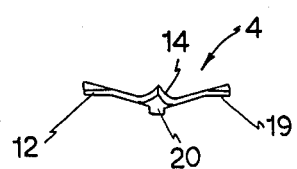
FIG. 4 shows an end elevation in the direction IV—IV.

The fastening device 4 of the present invention in its preferred form as used for securing door jambs and window frames, is stamped from sheet metal preferably zinc coated steel sheet of 0.8 mm thickness. The preferred length of the device is approximately 80 mm. As can be seen from FIG. 2, the device is an elongated plate, which in its preferred form has a single lengthwise stiffening rib provided by pressing or folding the plate about the dotted line shown in FIG. 2, so that the side 13 and the side 18 lie in planes which intersect at 150°. End 11 of the plate is pointed at the tip 14 and fastening means, which are preferably holes 9, 10 and 17 are provided in the plate adjacent to the other end. The hole 9 is preferably slotted. The pointed tip is preferably inclined at an angle of about 15° to the longitudinal axis of the device as shown in FIG. 3 and shoulders 12 and 19 are preferably provided to act as depth stops. A barb 20 is preferably provided near the point and is preferably aligned in the same plane as the tip 14.

Figure 1:
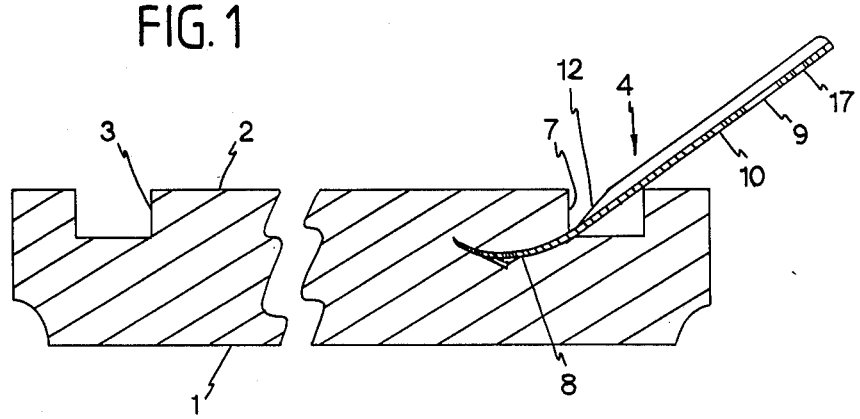
FIG. 1 shows a cross-section through a grooved door jamb having a preferred fastening device, according to the present invention, driven into it.
Figure 5:
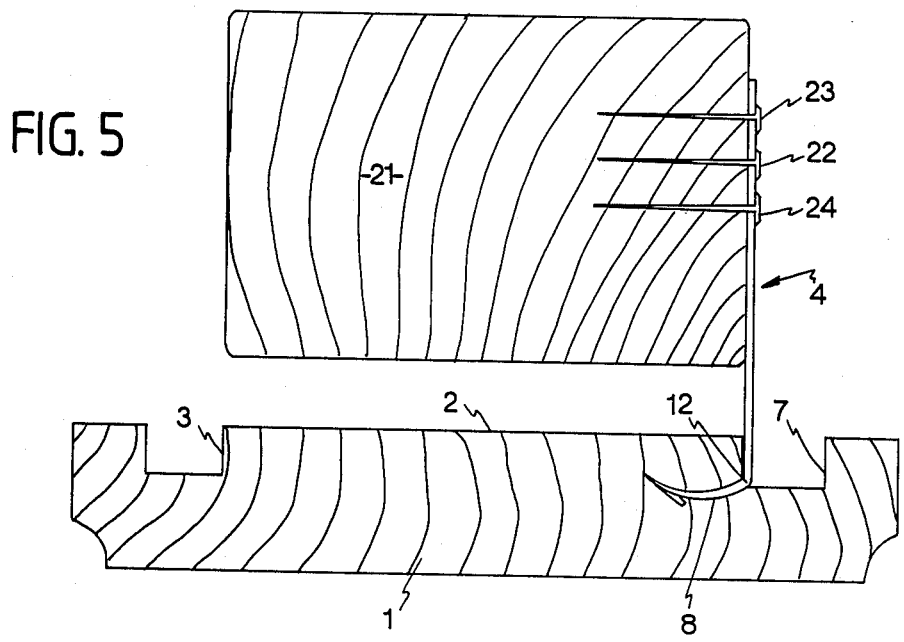
FIG. 5 shows a jamb plate and framework stud in cross-section with the fastening device in position and which, for the sake of clarity, has not been cross-sectioned.

One method of using such a fastening device is illustrated in FIGS. 1 and 5, which show a typical door jamb 1, having a back face 2, which is grooved at 3 and 7 to receive a pressed wood chip, or paper covered plaster, wall lining board, which is adapted to seat into the grooves 3 and 7 on either side of the framework, eliminating the need for a separate architrave around the door jamb.

The pointed end 11 of the fastening device 4, is driven into the rear of the jamb 1 at the corner of a groove such as 7. The device is hammered in until the shoulders 12 and 19 impede further insertion. Usually all the fastening plates would be inserted along at least the hinged side of the jamb prior to the jamb being slid into the framework. When the jamb is in position in the framework, the fastening plates are hammered against the stud 21 and nails such as 22 are inserted through the slotted holes 9 to act as a temporary holding. When the jamb has been properly aligned to be vertical and correctly spaced from the door, nails 23 and 24 may be inserted through the holes to fix the plate in its final position.

Figure 6:
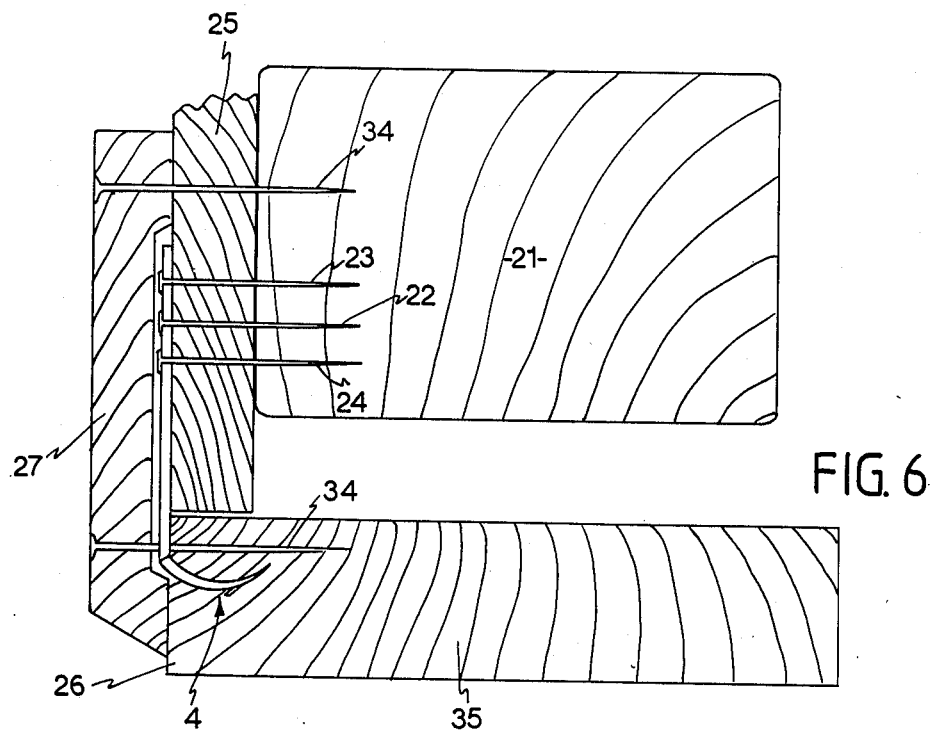
FIG. 6 shows a cross-section through a door jamb of different type, a framework stud and an architrave, to illustrate an alternative manner of using the fastening device which for the sake of clarity has not been cross sectioned.

FIG. 6 shows the invention used in a situation where architraves are required. There, the wall board 25 is fixed prior to driving in the fastening plates. Fastening plate 4 is then driven in through an edge 26 of the jamb 35 and is then hammered flush into the wall board and nailed. Architrave 27 is fixed by nails 34 subsequently and if the width of this is such that the tail end of the fastening plate projects, then the plate may either be hammered into the wall board, the depression subsequently being plastered over, or, any surplus length may be trimmed off using a hacksaw, or a pair of tinsnips prior to using the device.

Figure 13:
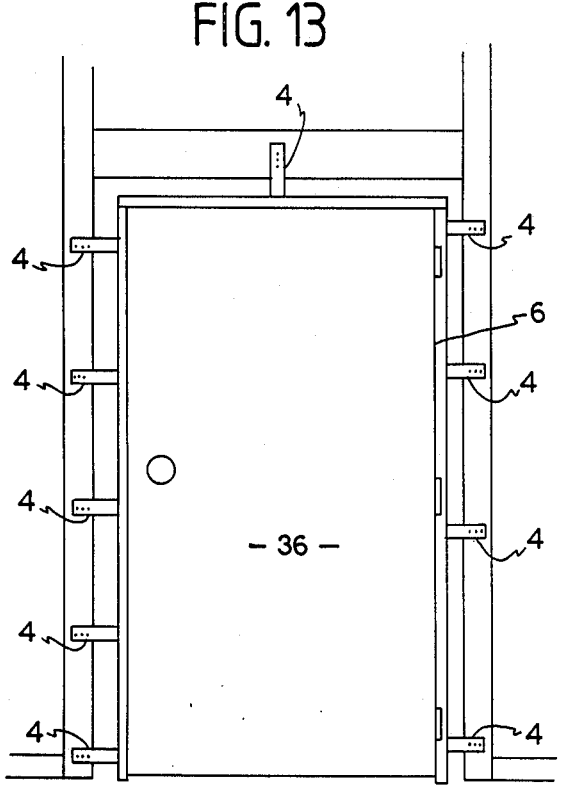
FIG. 13 shows an elevation of a door, door jamb and framework to illustrate the placing of the fastening devices.

As can be seen from FIG. 13, on the hinge side 6 of a door 36 it is preferably to use three or four fastening devices. There could also be one at the head and five on the latch side, which is subjected to greater potential movement, as it must resist the momentum of a slamming door. It will be appreciated that the fastening plates are used on both sides of the framework. A lesser number, say 3 each edge, can be used on the other side.

The easiest method of installation of the jamb is to fix all the plates on the hinge side first right around the door with the door supported by a wall, slide the door into position, bend the plates and nail them to the studs and lintel and then drive in, bend and fasten the plates on the other side of the framework.

Figure 7:
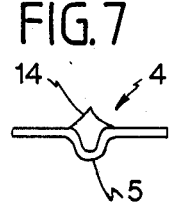
FIG. 7 shows an alternative form of stiffening rib in end elevation.
Figure 8:
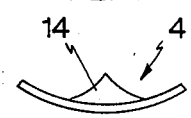
FIG. 8 shows in end elevation another possible stiffening rib.
Figure 9:
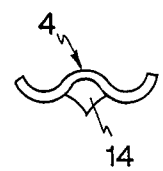
FIG. 9 shows in end elevation yet another arrangement showing a plurality of stiffening ribs.

The plates must be made of thin enough metal to enable them to be bent readily and yet must be stiff enough to be driven. To achieve this, at least one strengthening rib is needed along the length of the plate, and this may be formed in any desired manner. For example, FIG. 7 shows an embodiment where the rib 5 is comparatively narrow. FIG. 8 shows an embodiment where the cross-section is arcuate and thus a broad rib is provided, while FIG. 9 shows an embodiment with one and a half corrugations.

Figure 10:
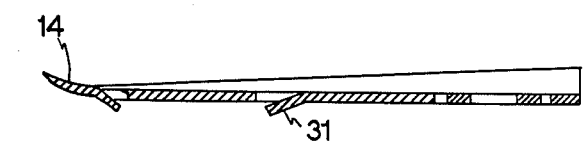
FIG. 10 shows a central longitudinal cross-section through an alternative form of fastening device, having a different form of depth stop.
Figure 11:
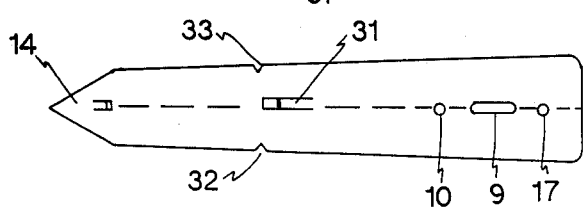
FIG. 11 shows a plan view of such a device.

Some form of depth stop is desirable, but not absolutely essential. Instead of the shoulders 12 and 19, it is possible to have a protruding tongue 31 joggled out of the plane of the plate, as shown in FIGS. 10 and 11, which will perform the same function as the shoulders. In such a situation it may be desirable to have nicks 32 and 33 to facilitate bending at the desired region. The shoulders or tongue may enable removal of a device which has been incorrectly inserted using the claws of a claw hammer.

Figure 12:
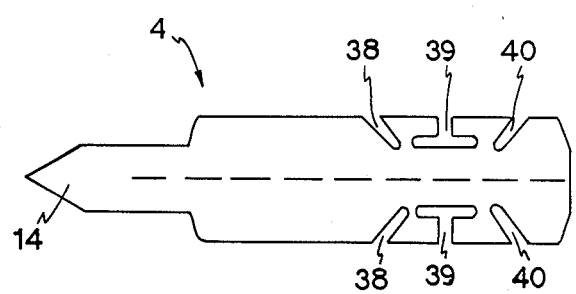
FIG. 12 shows an alternative means of providing fixing apertures other than by providing holes through the fastening device.

If for any reason, such as provision of a central rib 5 as shown in FIG. 7, it is not possible to provide fixing apertures along the centre line of the device, then the apertures may project inwardly from the edges as shown in FIG. 12, where nails may be inserted into one or more of the variety of pairs of slots 38, 39 and 40.

The inclination of the tip 14, so that it is angled approximately 15° from the general plane or axis of the plate, as can be seen in FIG. 3, is useful in that when the plate is driven into a jamb, end 11 bends as it is inserted to form a hook leading to much firmer securement of the plate than if no such bending occurred. The hooking also enables a longer length of plate to be driven into the jamb without risk of penetrating the front face.

Although use of the invention has been described in connection with door jambs, exactly the same considerations apply to window frames, except that it may additionally be desired to secure the sill to the framework as well.

FIGS. 14 and 15 show an alternative form of device 41 which has two pointed ends 42 and 43 and a single shoulder between them 44, which acts as a depth stop. There is a central lengthwise fold about the line 45, shown dotted, and as well the two pointed ends 42 and 43 may be similarly creased or bent about the lines 46 and 47, which may be approximatey the length indicated on the drawing or may extend the full length to the end 48, thus providing three ribs. As shown in FIG. 15, the pointed tips of the ends 42 and 43 may both turn down in the same direction, but they could optionally be inclined in opposite directions which might provide a more secure fixing in some applications.

In the embodiment shown in FIGS. 16 to 18, the fastening device 50 is provided with fastening means in the form of integral nail spikes 51 and 52 which are cut from the body of the plate forming the fastening device and are joggled and bent so that they can be driven back through the apertures 53 and 54 from which they were cut to penetrate into the framework. There may additionally be an extra hole or holes such as the slotted hole 55.

It will be appreciated that the fastening device of the present invention is relatively light and compact and can easily be carried in a carpenter's nail pouch. Use of the device can dramatically decrease the time necessary for inserting a door jamb in a framework, eliminating as much as 25 minutes from the job. Therefore where labour costs are high, the use of this invention can result in significant savings. Furthermore, if it is necessary to ease off a jamb, to create greater clearance from the door, a block of wood may be placed on the face of the jamb and struck with a hammer which will usually result in the jamb moving sufficiently to give the required clearance.

By use of this invention there are no nails passing through the face of the door jamb, which eliminates a considerable amount of puttying or stopping and smoothing prior to varnishing or painting the jamb providing a further saving of time and a superior finish.

Another application for fastening devices according to this invention, is in securing masonry or brickwork to a wooden frame. The preferred shape of fastening device for such an application is shown in FIGS. 19 to 21 where it can be seen that the device 60 is provided with three lengthwise ribs 61, 62 and 63, the central rib 61 extending to the tip 62 which is hooked as in the previously described construction. The thickness of the steel from which such a device is manufactured is preferably 1.2 mm and the device would preferably be hot-dip galvanized after manufacture. Two barbs 72 and 73 would preferably be provided. Preferably there would two or more portions such as 64 and 65 joggled from the central rib 61 to provide fastening means which are adapted to be embedded in the mortar 66 (FIG. 22) between two layers of bricks 67 and 68 to prevent longitudinal movement of the fastening device 60 within the mortar joint once the joint had hardened. The preferred length of such a device would be of the order of 145 mm and the width would be about 15 mm.

As can be seen from the dotted outline in FIG. 22, the device is inserted on an angle into the wooden stuc 69 which would usually be flanked by building paper 70 and then, when inserted, the device is hammered downwardly in the direction of the arrow until it lies in the correct plane in the mortar or where the mortar is to be placed. A bevelled or inclined portion 71 is so shaped that the ends of the device lie substantially in different parallel planes so that when the device is in its final position, embedded in the mortar layer, portion 71 rises upwardly and therefore prevents water which may have dripped or seeped onto the device from running back up the building paper 70.

As with the form of the device useful with jambs and window frames, this construction which is useful for brickwork and masonry is also relatively compact and eliminates the need for nails, thus speeding up considerably the placement of such devices. The reader will appreciate that many different embodiments of the device are possible, e.g. ones with two pointed heads etc., only a single lengthwise rib, and so forth along the lines already discussed in connection with the embodiment used for fastening jambs and window frames.

What I claim is:

1. A fasteneing device, comprising an elongated sheet metal plate having a lengthwise stiffening rib, wherein one end of the plate being pointed; and fastening means being provided in the plate adjacent the other end, wherein the tip of the pointed end lies at an angle to the general plane of the plate and includes a joggled barb substantially coplanar with the tip of the pointed end, wherein the pointed end penetrates a member for coupling thereto and wherein the fastening means is bendable for attaching to another member.

2. In combination, a grooved liner cooperating with a plurality of the fastening devices of claim 1.

3. A masonry panel having an end of a fastening device of claim 1 embedded therein, wherein the pointed end of the said fasteneing device is free and capable of being inserted into a wall member.

4. A fasteneing device as claimed in claim 1 which includes a projection which acts as depth stop.

5. A fastening device as claimed in claim 1, wherein said angle of the tip is substantially 15°.

6. A fastening device as claimed in claim 1, wherein the device is folded about its longitudinal centre line so that it substantially lies in two intersecting planes.

7. A fastening device as claimed in claim 6, wherein said planes intersect at an angle of substantially 150°.

8. A fastening device as claimed in claim 1 wherein there is an inclined portion between ends of the fastening device, wherein said ends lying substantially in different parallel planes.

9. A fastening device comprising an elongated sheet metal plate having a lengthwise stiffening rib, one end of the plate being pointed and fastening means being provided in the plate adjacent the other end, wherein the tip of the pointed end lies at an angle of substantially 15° to the general plane of the plate and includes a joggled barb substantially coplanar with the tip of the pointed end and the device includes a projection comprising a pair of shoulders which acts as a depth stop and the device is folded about its longitudinal center line so that it substantially lies in two intersecting planes which intersect at an angle of substantially 150° and said fastening means are apertures provided along the center line of the device and comprise at least one longitudinally slotted hole.

10. A fastening device, comprising an elongated sheet metal plate having a lengthwise stiffening rib, one end of the plate being pointed and fastening means being provided in the plate adjacent the other end, wherein the tip of the pointed end lies at an angle to the general plane of the plate and includes a joggled barb substantially coplanar with the tip of the pointed end, wherein the fastening means are apertures provided along the centre line of the device and comprise at least one longitudinally slotted hole.

11. A fastening device, comprising an elongated sheet metal plate having a lengthwise stiffening rib, one end of the plate being pointed and fastening means being provided in the plate adjacent the other end, wherein the tip of the pointed end lies at an angle to the general plane of the plate and includes a joggled barb substantially coplanar with the tip of the pointed end and a projection which acts as a depth stop, wherein said projection comprises a pair of shoulders.

* * * * *